United States Patent [19]

Ferrante

[11] Patent Number: 4,815,683
[45] Date of Patent: Mar. 28, 1989

[54] HOLDER FOR REMOTE CONTRL UNITS FOR TV, VCR AND THE LIKE

[76] Inventor: Laureen Ferrante, 1958 77th St., Brooklyn, N.Y. 11214

[21] Appl. No.: 109,912

[22] Filed: Oct. 19, 1987

[51] Int. Cl.⁴ ............................................. A47B 96/06
[52] U.S. Cl. .............................. 248/205.2; 248/309.1; 248/314
[58] Field of Search .................. 248/314, 205.2, 205.3, 248/205.4, 309.1, 310, 311.2; 211/88, 86, 75; 312/7.2, 7.1

[56] References Cited

U.S. PATENT DOCUMENTS

| | | | |
|---|---|---|---|
| 1,018,729 | 2/1912 | Sine | 211/69 |
| 1,135,625 | 4/1915 | Savin | 211/69 X |
| 2,204,787 | 6/1940 | Blanke | 312/7.1 |
| 2,471,825 | 5/1949 | Long | 248/314 |
| 2,659,490 | 11/1953 | Swan | 211/69 |
| 2,693,332 | 11/1954 | Albert | 248/314 X |
| 3,110,533 | 11/1963 | Bron | 312/7.2 X |
| 3,281,106 | 10/1966 | Bogdanovich | 248/314 |
| 3,292,890 | 12/1966 | Bassett | 248/314 |
| 3,547,274 | 10/1970 | Sosinski | 248/314 X |
| 4,610,054 | 9/1986 | Malian | 248/205.2 X |
| 4,727,598 | 2/1988 | Ehlers | 312/7.2 X |

FOREIGN PATENT DOCUMENTS 101042  2/1965  Denmark ........................ 248/205.2

Primary Examiner—J. Franklin Foss
Attorney, Agent, or Firm—Lilling & Greenspan

[57] ABSTRACT

A holder for TV/VCR remote control unit is generally rectangular and has one or two remote control unit receiving compartments. Variously shaped spacer brackets can be used to attach the holder to a support surface such as the housing of a TV or VCR. Advantageously, resilient members, such as springs or foam pads are placed into the receiving compartments to selectively elevating the remote control units above the holder to facilitate gripping and provide protection to the units against mechanical shock.

24 Claims, 2 Drawing Sheets

HOLDER FOR REMOTE CONTRL UNITS FOR TV, VCR AND THE LIKE

BACKGROUND OF THE INVENTION

1. Field of the Invention

This invention generally relates to holding or receiving devices, and more specifically to a holder for a remote control unit or units.

2. Description of the Prior Art

Traditionally, the controls for an electrical appliance, such as a television set, stereo, or the like have been mounted directly on the unit. While the actuation of these controls has required the user to physically move proximate to the unit to be controlled, the controls were always available since they could not be misplaced. With advent of remote control units for electronic appliances, controlling these has become substantially more convenient. However, a problem that has arisen is the misplacement of the remote control units. Of course, once the remote control unit is misplaced and becomes unavailable, the convenience or advantage of such unit is lost. This problem has been aggravated by the fact that many of the functions which are available by the use of remote control units are not available when these units become lost. There are numerous functions which, on some electronic devices, can only be controlled by the remote control units. Thus, when such remote control units become lost, the electronic appliances, be they television sets, VCRs, stereos, or the like only the basic functions on the units can be controlled. As the remote control units have become more sophisticated, fewer and fewer controls are provided on the sets themselves. It has, therefore, become increasingly important to prevent misplacement of remote control units as well as to ensure that the same are well maintained and protected from damage.

SUMMARY OF THE INVENTION

In order to avoid misplacement of remote control units for television sets, VCRs, stereos, and like, the present invention is for a holder for a remote control unit comprising receiving means defining a three dimensional space greater than the three dimensional space occupied by the remote control unit and having an opening dimensioned to allow free insertion of the remote control unit into and free removal of the remote control unit from said receiving means. Attaching means provided for attaching said receiving means to a surface to orient said opening generally upwardly to prevent a remote control unit placed into said receiving means from falling out due to the action of gravity.

In accordance with some advantageous features of the present invention, there is further provided elevating means at the end of said receiving means remote from said opening for selectively elevating and positioning one end of the remote control unit beyond said opening and exteriorily of said receiving means to facilitate gripping of the remote control unit and removal thereof from the holder. Such elevating means may be in the form of a spring or a pad made of foam material. Additionally, there are advantageously provided spacer means for attaching the holder to a support surface in spaced relation thereto.

BRIEF DESCRIPTION OF THE DRAWINGS

The invention will be further described by way of example, with reference to the accompanying drawings, in which.

DESCRIPTION OF THE PREFERRED EMBODIMENTS

Figures 1A, 1B:
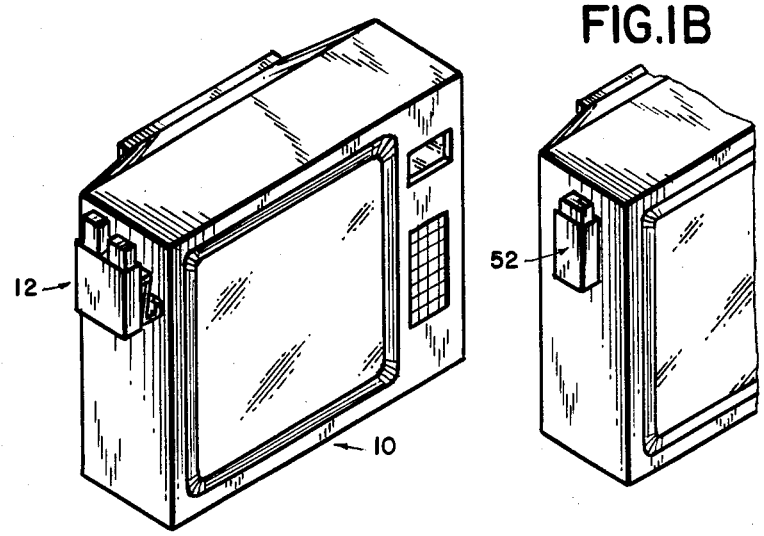
FIG. 1A is a perspective view of a TV/VCR remote control holder in accordance with the present invention, shown mounted on the side panel of an enclosure or housing of a television set.
FIG. 1B is a fragmented view similar to FIG. 1A, but showing a modified form of the holder adapted to receive and contain only one remote control unit instead of two remote control units.

Referring now specifically to the Figures, in which identical or similar parts are designated by the same reference numerals throughout, and first referring to FIG. 1A, a television set is generally indicated by the reference numeral 10. It will be understood that for purposes of the present invention, reference will be made to a television set, although it will become clear that any other electronic or electrical device can be used, such as a VCR, stereo, or the like. Mounted on the television set 10 is a remote control holder in accordance with the present invention, designated by the reference numeral 12.

Figure 2:
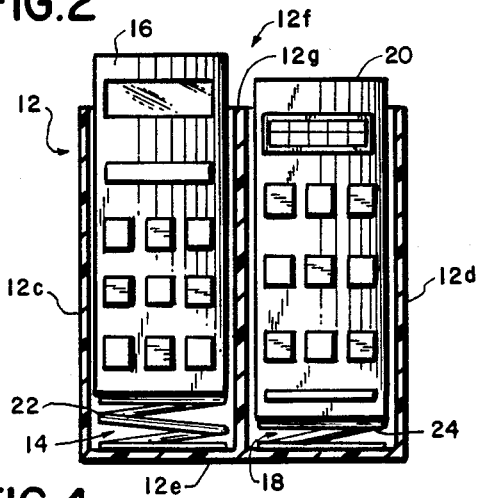
FIG. 2 is a cross-sectional view of the holder shown in FIG. 3, taken the long line 2—2, showing two remote control units positioned within the holder in accordance with the present invention, and showing two differently sized springs one in each compartment to selectively and variously elevate the remote control holders above the opening thereof.
Figure 3:
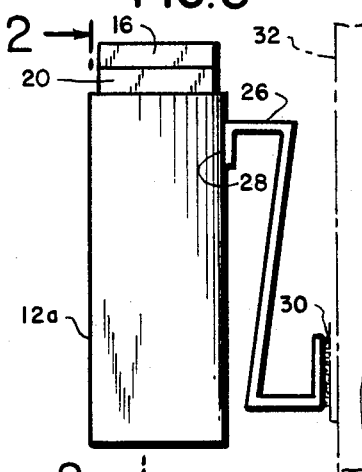
FIG. 3 is a side elevational view of the remote control holder shown in FIG. 2, showing use of a "Z" bracket for mounting the holder onto a mounting surface.
Figure 4:
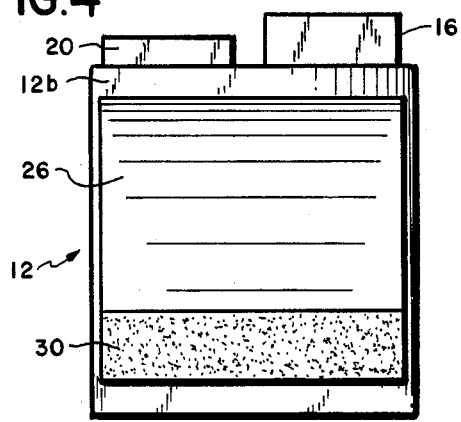
FIG. 4 is a rear elevational view of the holder shown in FIGS. 2 and 3, showing a strip of adhesive applied to the "Z"-bracket for mounting same onto a support or mounting surface.

Referring to FIGS. 2-4, the details of the holder 12 will be described. The holder 12 includes a front wall 12a, rear wall 12b, side walls 12c and 12d, and a bottom wall 12e as shown. At th end of the holder 12 opposite to the bottom wall 12e is an opening 12f. The aforementioned walls 12a–12e form a receiving means which defines a three dimensional space greater than the three dimensional space occupied by a remote control unit to be housed within the holder. The opening 12f is dimensioned to allow free insertion of the remote control unit into and free removal of the remote control unit from the receiving means or holder 12. Thus, it would be evident that the holder 12 is generally boxed-shaped and has a top opening 12f when mounted on a supporting surface.

The walls 12a-12e define an internal compartment dimensioned to receive at least one remote control unit. In the embodiment 12 shown in FIGS. 1A and 2-4, an internal separating wall or partition 12f is provided for dividing the internal space of the holder 12 into two individual compartments each dimensioned to receive another remote control unit. Thus, a first compartment 14 is dimensioned to receive a remote control unit 16 and a second compartment 18 is dimensioned to receive a second remote control unit 20. As will be described below, the holder can be dimensioned to receive only a single remote control unit. In FIGS. 2-4, the internal compartment of the holder 12 is dimensioned to receive two remote control units side by side as shown. Any other arrangement, however, of the remote control units is possible, such as by placing the units in front of each other or one in back of the other. In the arrangement shown, the internal separating wall 12g is generally parallel to the side walls 12c and 12d. For the alternate arrangement, wherein units are one behind the other, the internal separating wall or partition 12g would generally be disposed parallel to the front and rear walls 12a and 12b.

In accordance with one feature of the present invention, there is advantageously provided elevating means at the end of the holder remote from the opening 12f for selectively elevating and positioning one end of the remote control unit beyond the opening 12f exteriorily of the holder to facilitate gripping of the remote control unit and removal thereof from the holder. The elevating means is preferrably resilient for absorbing mechanical shock of impact when the remote control unit is dropped into the holder. In accordance with one presently preferred embodiment of the elevating means, it consists of a spring, such as a helical compression spring shown in FIG. 2. Where two remote receiving compartments are provided, each compartment 14, 18 is advantageously provided with separate elevating means having different dimensions to cause each of the two remote control units placed within the compartment to project lesser and greater distances beyond the holder opening 12f to facilitate selective gripping of one or the other of the remote control units. In FIG. 2, the spring 22 is a helical spring having a greater axial length than that of the helical spring 24, so that the remote control unit 16 projects further above opening 12f than does the remote control unit 20 which rests on the shorter spring 24.

Figure 5:
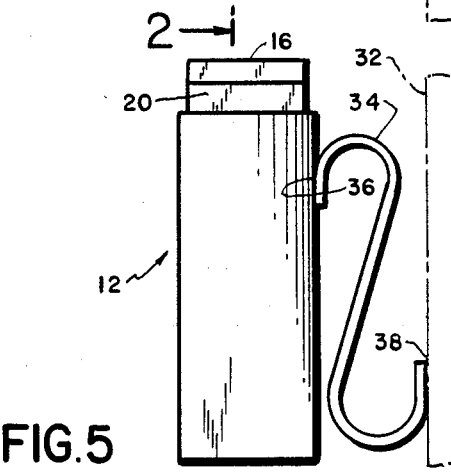
FIG. 5 is similar to FIG. 3, but showing the use of an "S"-bracket for mounting the holder onto the mounting surface.
Figure 6:
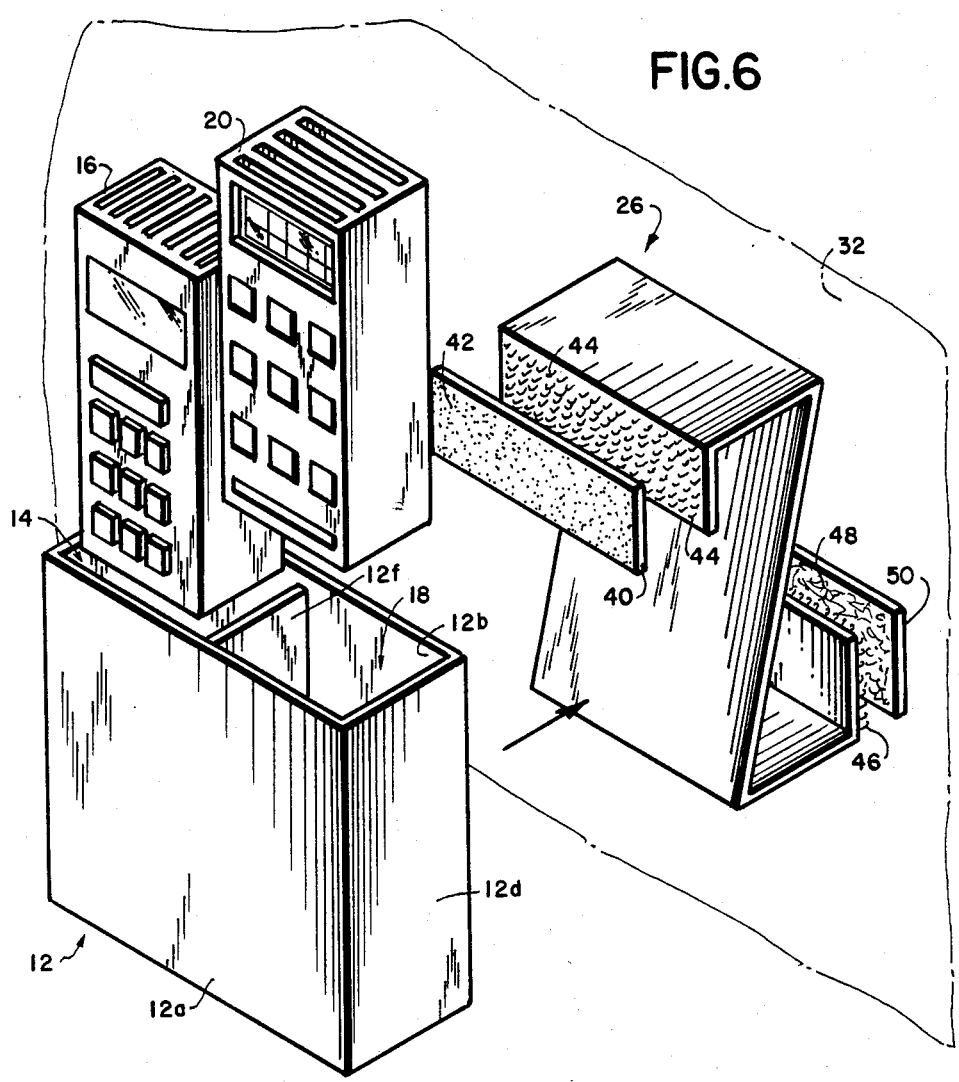
FIG. 6 is an exploded view of the holder in accordance with the present invention shown in FIGS. 2-4, showing the receiving compartments within the holder for the remote control units, and showing the details of one attaching means for attaching the holder to a mounting surface.

Suitable attaching means for attaching the receiving means or holder to a supporting surface may be used to orient the opening generally upwardly to prevent a remote control unit placed into the receiving means from falling out due to the action of gravity. Thus, the attaching means may consist of adhesive for attaching the holder to a support surface, as suggested in FIG. 1B. Additionally, there may be provided spacer means for attaching the holder 12 to a support surface in spaced relation thereto. Referring to FIG. 3, such spacer means is shown to be in the form of at least one "Z" shaped bracket 26. The bracket 26 is shown connected to the holder 12 at a contact point 28 in any conventional matter, such as by the use of adhesive. Adhesive 30 can also be used at the lower portion of the bracket 26 to connect the bracket to a mounting surface 32, such as the side of a television set enclosure. In FIG. 5, a "S" shaped bracket is shown which may also be used to mount the holder 12. Here, the bracket 34 is shown secured to the holder 12 and to the mounting surface 32 at contact points 36 and 38.

Referring to FIG. 5, the details of another method of mounting the holder 12 is shown, wherein a strip of loop tape 40 is adhesively connected at 42 to the holder 12, the loop tape 40 being provided with loops on the opposing side facing hook tape 44 applied to the bracket 26. Similarly, a hook tape 46 shown on the lower portion of the bracket 26 which is arranged to cooperate with loop tape 48 which is adhesively connected at 50 to a supporting surface 32. The advantage of using a hook and loop tape is, of course, that the holder 12 as well as the bracket 26 can be selectively removed and repositioned as desired. Where the mounting surface is metallic magnets can also be used to attach the holder to the separating surface.

Figure 7:
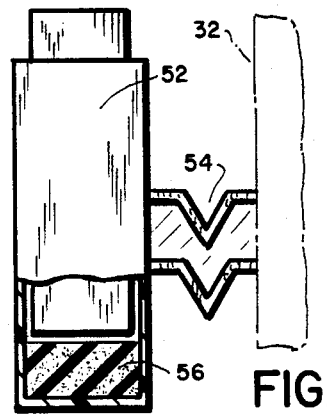
FIG. 7 is a side elevational view of the holder shown in FIG. 1B, shown partially broken away to illustrate another form of elevating means in the form of a foam pad, and also showing the use of "V" brackets for mounting the holder onto a mounting surface.

In FIG. 7, a modified arrangement is shown of a holder 52 adapted to receive only a single remote control unit. Additionally, the elevating means is shown in the form of a foam pad 56 instead of springs. Furthermore, "V" shaped brackets are shown for securing the holder 52 to the supporting surface 32.

Figure 8:
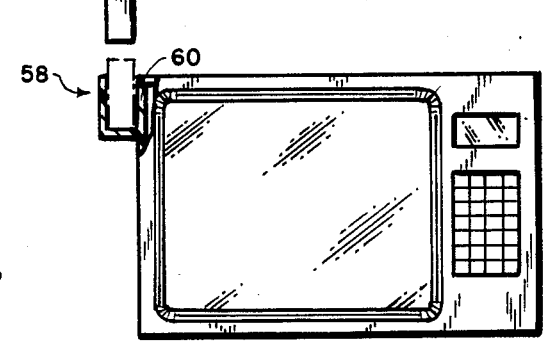
FIG. 8 is a front elevational view of a television set showing another embodiment of the invention wherein the holder is integrally formed with the enclosure of housing of the television set.

An integral construction is shown in FIG. 8, wherein the holder 58 is shown integrally formed with the side wall of the enclosure housing of the television set. Each of these forms of attachment provides different degrees of advantage.

With a holder of the type above described, misplacement of the remote control units is avoided at all times. Additionally, and equally importantly, the holder makes it possible to mount or attach remote control units of the type under discussion anywhere where it is convenient to reach and use the remote control units including, but not limited to the surfaces of the units being controlled, furniture, walls, appliances, etc. The convenience substantially facilates the access to and use of the remote control units. By placing the units, for example, at a sufficient height, the holder provides the added advantage that it renders the remote control units inaccessable to young children thereby preventing damage thereto.

What is claimed is:

1. Holder in combination with a TV/VCR remote control unit comprising means defining a three dimensional space greater than the three dimensional space occupied by the remove control unit and having an opening dimensioned to allow free insertion of the remote control unit into and free removal of the remote control unit from said receiving means, said receiving means being a generally box-shaped enclosure having front, rear, bottom and side walls and a top opening when mounted as a supporting surface and attaching means for attaching said receiving means to a surface to orient said opening generally upwardly to prevent a remote control unit placed into said receiving means from falling out due to the action of gravity and to permit gripping of the remote control unit.

2. A holder as defined in claim 1, wherein said walls define an internal compartment dimensioned to receive a single remote control unit.

3. A holder as defined in claim 2, wherein said walls define an internal compartment dimensioned to receive two remote control units.

4. A holder as defined in claim 3, wherein said internal compartment is dimensioned to receive two remote control units side by side.

5. A holder as defined in claim 3, further comprising an internal separating wall or partition for dividing said internal compartment into two individual compartments each dimensioned to receive another remote control unit.

6. A holder as defined in claim 5, wherein said internal separating wall is parallel to said side walls.

7. A holder as defined in claim 1, further comprising elevating means at the end of said receiving means remote from said opening for selectively elevating and positioning one end of the remote control unit beyond said opening and exteriorily of said receiving means to facilitate gripping of the remote control unit and removal thereof from the holder.

8. A holder as defined in claim 7, wherein said elevating means is resilient for absorbing mechanical shock of impact when the remote control unit is placed into the holder.

9. A holder as defined in claim 8, wherein said elevating means comprises a spring.

10. A holder as defined in claim 9, wherein said spring is a helical compression spring.

11. A holder as defined in claim 8, wherein said elevating means comprises a foam material.

12. A holder as defined in claim 8, wherein said receiving means has two compartments each for receiving another remote control unit, and wherein two elevating means are provided one in each of said two compartments.

13. A holder as defined in claim 11, wherein said two elevating means have different dimensions to cause two remote control units placed within said two compartments to project beyond said holder opening lesser and greater distances to facilitate selective gripping of one or the other of the remote control units.

14. A holder as defined in claim 1, wherein said attaching means comprises an integral connection with a support surface.

15. A holder as defined in claim 1, wherein said attaching means comprises adhesive for attaching the holder to a support surface.

16. A holder as defined in claim 1, further comprising spacer means for attaching the holder to a support surface in spaced relation thereto.

17. A holder as defined in claim 16, wherein said spacer means comprises at least one "Z" shaped bracket.

18. A holder as defined in claim 16, wherein said spacer means comprises at least one "S" shaped bracket.

19. A holder as defined in claim 16, wherein said spacer means comprises at least one "V" shaped bracket.

20. A holder as defined in claim 1, wherein said attaching means includes hook and loop tape.

21. Holder for a TV/VCR remote control unit comprising means defining a three dimensional space greater than the three dimensional space occupied by the remote control unit and having an opening dimensioned to allow free insertion of the remote control unit into and free removal of the remote control unit from said receiving means said receiving means; elevating means at the end of said receiving means remote from said opening for selectively elevating and positioning one end of the remote control unit beyond said opening and exteriorly of said receiving means to facilitate gripping of the remote control unit and removal thereof from the holder said elevating means being resilient for absorbing mechanical shock of impact when the remote control unit is placed into the holder; and attaching means for attaching said receiving means to a surface to orient said opening generally upwardly to prevent a remote control unit placed into said receiving means from falling out due to the action of gravity.

22. A holder as defined in claim 21, wherein said receiving means is a generally box-shaped enclosure having front, rear, bottom and side walls and a top opening when mounted as a supporting surface.

23. Holder for a TV/VCR remote control unit comprising means defining a three dimensional space greater than the three dimensional space occupied by the remote control unit and having an opening dimensioned to allow free insertion of the remote control unit into and free removal of the remote control unit from said receiving means said receiving means; said receiving means defining an internal compartment dimensioned to receive two remote control units, and having an internal separating wall or partition for dividing said internal compartment into two individual compartments each dimensioned to receive another one of said remote control units and positioning same in relation to each other to facilitate gripping of either remote control unit and attaching means for attaching said receiving means to a surface to orient said opening generally upwardly to prevent a remote control unit placed into said receiving means from falling out due to the action of gravity.

24. Holder in combination with a TV/VCR remote control unit comprising receiving means defining a three dimensional space greater than the three dimensional space occupied by the remote control unit and having an opening dimensioned to allow free insertion of the remote control unit into and free removal of the remote control unit from said receiving means; and attaching means for attaching said receiving means to a surface to orient said opening generally upwardly to prevent a remote control unit placed into said receiving means from falling out due to the action of gravity, said support surface defining an upper edge, said attaching means comprising an integral connection with said support surface and said receiving means being arranged to position said opening proximate to said upper edge, whereby a control unit placed into the holder extends above said upper edge to thereby facilitate grasping of same.

* * * * *